Nov. 20, 1951

H. S. PETCH 2,575,680

LIVE LINE DETECTOR

Filed Feb. 27, 1948

INVENTOR
HERBERT STANLEY PETCH
BY Mock + Blum
ATTORNEYS

Patented Nov. 20, 1951 2,575,680

UNITED STATES PATENT OFFICE 2,575,680

LIVE LINE DETECTOR

Herbert Stanley Petch, Edgware, England, assignor to Elliott Brothers (London) Limited, London, England, a company of Great Britain Application February 27, 1948, Serial No. 11,684
In Great Britain August 1, 1945

Section 1, Public Law 690, August 8, 1946
Patent expires August 1, 1965

15 Claims. (Cl. 175—183)

Figures 1, 2, 3, 4, 5, 6, 7, 8, 9:
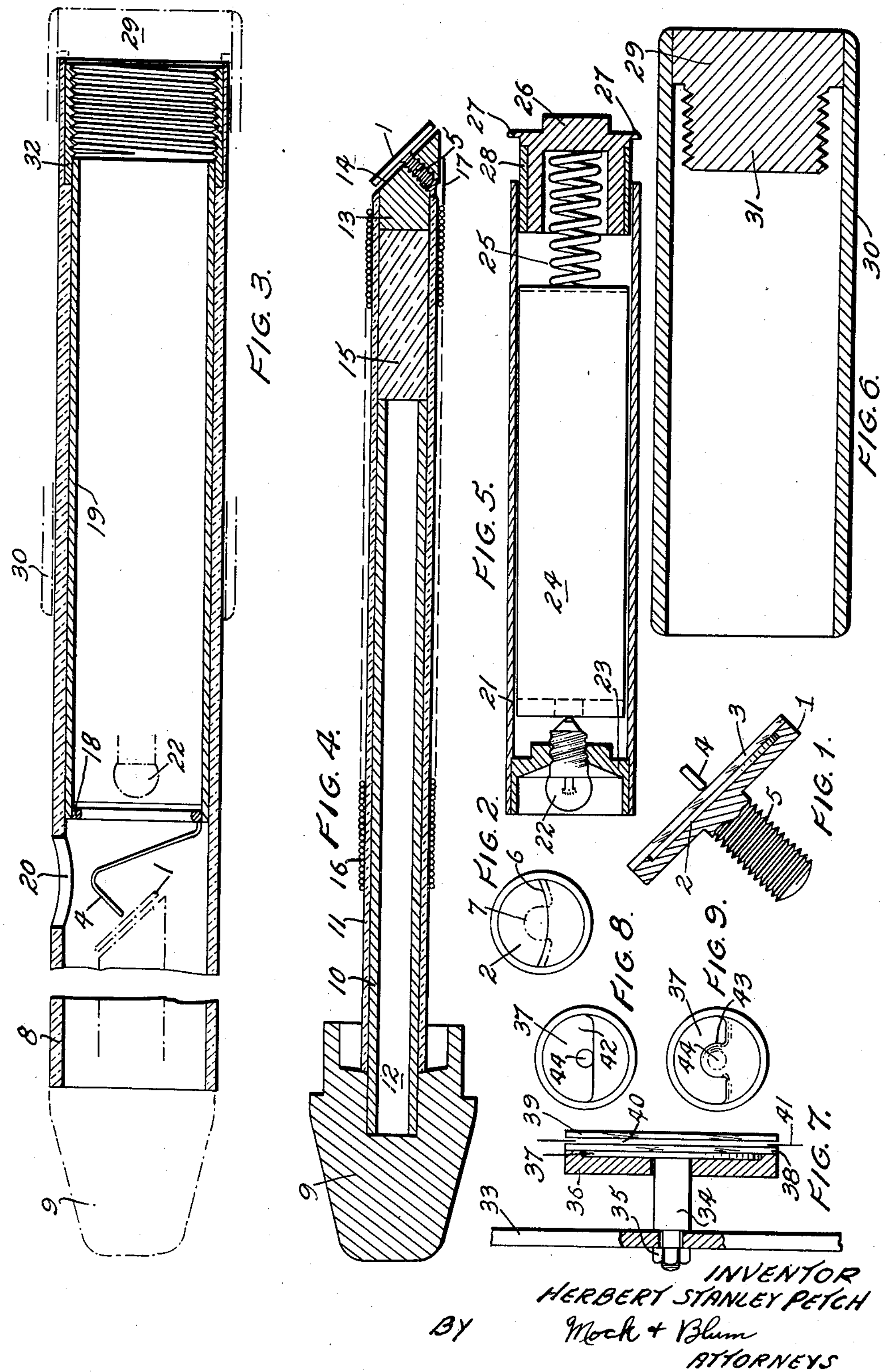

This invention relates to means for the purpose (hereinafter referred to as the purpose described) of indicating whether electric conductors are connected to or disconnected from a source of supply. Such means are of great value and prime importance from the point of view of the protection of personnel engaged in tending or servicing electrical apparatus dealing with high voltages, such as transformers and switchgear in electricity stations, since they may be utilised to give a final check that all the prescribed precautionary measures have been taken to isolate a piece of apparatus before work is done thereon.

It is the object of the invention to provide improved means of this character which shall be reliable in operation, though simple in contruction, and which shall produce a readily recognisable visual indication when a conductor being tested is "live."

According to the invention indicating means for the purpose described comprises a chamber containing two immiscible fluids of differing specific inductive capacities, and a pair of electrodes so dispoed in relation to the chamber that the production of an electric potential difference between the electrodes will cause a visible change in the distribution of the fluids within the chamber.

The indicating means according to the invention may be permanently attached to a conductor or mounted in a portable apparatus for manual use.

In the accompanying drawing—

Fig. 1 is an elevation, partly in section, of an indicating unit and illustrates by way of example one form of the invention for use as a permanent attachment to an electric conductor to be tested or for incorporation in a portable apparatus, Fig. 2 is a front view of the unit shown in Fig. 1 but to a smaller scale and with one electrode removed, Fig. 3 illustrates by way of example one form of portable apparatus incorporating the unit shown in Fig. 1 but with parts removed for the sake of clarity, Fig. 4 shows the means for capacity coupling one electrode to a metal cap in the apparatus of Fig. 3, Fig. 5 is an illuminating device for use with the apparatus of Fig. 3, Fig. 6 is a sleeve for holding the illuminating device of Fig. 5 in position in the apparatus of Fig. 3, Fig. 7 illustrates by way of example a modified form of unit connected as a permanent attachment to a bus-bar, Fig. 8 is a front view of the unit illustrated in Fig. 7 but to a smaller scale and indicating that the bus-bar is '"dead," and Fig. 9 is a view similar to Fig. 8 but indicating that the bus-bar is "live."

Referring now to the form of the invention illustrated by way of example in Fig. 1, the indicating unit comprises a circular disc electrode 1 having a shallow circular depression or recess 2 formed centrally of one face and covered by a thin glass sheet 3 constituting a window to provide a closed cylindrical chamber which is of very small axial dimensions. This chamber is about half filled with air and the remainder of its volume is occupied by a liquid of high specific inductive capacity, that is a non-conductor of electricity. Good results have been obtained with a petroleum hydrocarbon (specific inductive capacity of 5) but other liquids may be employed. One suitable liquid is a commercial grade of gasoline. It is preferred to colour the liquid with a dyestuff or other substance if it has no characteristic colour itself. It is to be understood that one of the fluids in the chamber of the unit above referred to may be the vapour of a liquid constituting the other fluid, i. e. the chamber may be evacuated prior to the introduction of the liquid.

The unit is completed by the provision of a second electrode 4 of restricted cross-sectional area at its operative end, which end is presented axially to the centre of the chamber at a very short distance from or in contact with the glass cover sheet 3. The unit is usually employed with the plane of the glass sheet disposed vertically or but slightly inclined to the vertical.

In the use of the unit as an attachment to an electric conductor, the disc electrode 1 is secured to the latter by means of the threaded shank 5 which may be screwed into a threaded aperture in the conductor or secured in an aperture therein by means of nuts. Furthermore, in this use of the unit the second electrode 4 is attached by its operative end to the glass cover sheet 3, as by a spot of an insulating compound, with its other end free or carrying in some cases, an enlargement of spherical shape to increase its capacity to earth. Conveniently, the disc electrode 1 is made from brass, dull silver-plated, and the glass cover sheet 3 is secured thereto by means of shellac.

When the conductor is connected to a source of high potential, the capacity between the second electrode 4 and the earth is sufficient to cause the unit to give a characteristic indication, namely, the movement of liquid of high specific inductive capacity from its normal position of rest with its horizontal surface substantially bisecting the chamber, as outlined by the line 6, into the central area of the chamber so that it assumes a tree-like form in outline as shown by the dot-chain line 7. It is clear that if chamber 2, 3 were entirely filled with a liquid such as gasoline, the movement of the liquid would be difficult to detect visually. However, since chamber 2, 3 is filled with two fluid dielectrics, one of which is liquid, movement of the liquid dielectric may be readily observed.

Reference will now be made to Figs. 3-6 which illustrate by way of example a portable apparatus employing the unit of Fig. 1. This apparatus comprises a tube 8 of insulating material (Fig. 3) into which is fitted a metal cap 9 electrically connected to a metal tube 10 (see Fig. 4). The latter is enclosed in a sleeve 11 of insulating material except for the portion 12 which enters the metal cap 9 and may be a driving fit therein. A metal cap 13 is fitted into the end of the insulating sleeve remote from the cap 9 and has its external face 14 cut to an angle of 45 degrees to the axis of the tube 11, the threaded shank 5 of the device 1 being screwed into the cap 13 so that the plane of the glass sheet 3 is parallel to the face 14. Between the cap 13 and the end of the metal tube 10 there is disposed a plug of insulating material 15.

As illustrated there is provided a capacity coupling between the disc electrode 1 and the metal cap 9 by binding the insulating sleeve 11 with copper wire 16 and electrically connecting one end 17 of the latter to the metal cap 13. Although it is preferred to employ capacity coupling, the disc electrode 1 may be directly connected to the metal cap 9 by extending the metal tube 10 and securing the metal cap 13 thereto.

The second electrode 4 is disposed in the tube 8 with one end thereof presented axially to the centre of the disc electrode 1 and at a very short distance from or in contact with the glass cover sheet 3. As illustrated the second electrode 4 is substantially hook-shaped and has its other end sweated to a metal ring 18 which is sweated to a metal liner 19 in the insulating tube 8.

When in use the indicator may be viewed through an inspection aperture 20, the two electrodes 1 and 4 being mounted opposite this aperture and at a convenient viewing angle relative thereto. In order that the outline of the liquid may be more clearly seen the portable apparatus is provided with an illuminating device (see Fig. 5) comprising a tubular metal casing 21 which is slid into the metal liner 19 such that a lamp 22 mounted in a lamp holder 23 can illuminate the surface of the disc electrode 1. A cylindrical type battery 24 is positioned in the casing 21 and its positive electrode is adapted to be urged into contact with one contact of the lamp by means of a coil spring 25 which presses against the other end of the battery 24, the battery casing forming the negative electrode in the usual manner. The spring 25 is seated in a metal housing 26 which is axially movable in the casing 21 and provided with a flange 27, that part of the housing 26 fitting within the casing 21 being encased in a sleeve 28 of insulating material so that there is no electrical connection between the lamp holder or second contact of the lamp and the negative electrode of the battery until the flange 27 abuts against the casing 21 thus completing the electrical circuit of the battery and lamp.

Axial movement is imparted to the housing 26 by means of the spring 25 and a plug 29 of insulating material (see Fig. 6) which is secured in one end of a tubular metal member 30 slidably mounted on the tube 8. The plug 29 has a threaded portion 31 of reduced diameter for screwing into a threaded sleeve 32 secured in the tube 8.

In use, the tubular member 30 is rotated relatively to the tube 8 so that the portion 31 of the plug 29 is screwed into the tube 8 until such rotation is stopped by the flange 27 abutting against the end of the casing 21, in which condition the lamp 22 is energised. The apparatus is presented to a "live" conductor, metal cap 9 foremost, while gripping the tubular metal member 30, the user being insulated from the conductor by means of the insulating tube 8. However, there is sufficient capacity between the metal line 19 and the hand of the user to ensure that the second electrode 4 is capacity coupled to earth, through the body of the user, the liquid giving the characteristic indication.

Referring now to Fig. 7, there is illustrated by way of example a modified indicating unit attached to a bus-bar 33 by means of a metal rod 34 and nut 35. In this example, the unit comprises a circular disc 36 of insulating material having a shallow circular depression or recess 37 formed centrally of one face and covered by a thin glass cover sheet 38 to form a closed cylindrical chamber containing a liquid and air as described with reference to Fig. 1. The disc 36 is centrally mounted on the rod 34 which is also used as one electrode of the device and is in contact with the liquid.

In front of and spaced from the glass sheet 38 is a second glass cover plate 39 to provide a shallow cylindrical chamber 40 filled with a liquid conductor of electricity, such as waterglass, to form a transparent conductor. The latter serves as the second electrode of the device and, in order to increase its capacity to earth, an annular member 41 is secured between the two cover sheets 38 and 39 with its internal edge in contact with the transparent conductor. When the bus-bar is "dead" the liquid of high specific inductive capacity is in its normal position of rest, as shown by the line 42 of Fig. 8. However, when the bus-bar is "live" the liquid is moved so that it assumes the outline indicated by the line 43 of Fig. 9.

As illustrated in Figs. 8 and 9, a reflector 44 is disposed centrally in the recess 37 such that it reflects light when the bus-bar is "dead" but is covered by the liquid in the recess 37 when the bus-bar is "live." This is particularly advantageous in those cases where the indicating device is used in a dark place and the operator must use a torch to view the liquid.

I claim:

1. Indicating means for the purpose described comprising a chamber having at least a shallow portion, two visibly distinguishable immiscible non-conducting fluids of differing specific inductive capacities, within said chamber and a pair of electrodes disposed opposite to each other at the shallow portion of the chamber with the fluids therebetween and in the vicinity of the surface between the two fluids.

2. Indicating means according to claim 1 wherein the chamber is constituted by a disc having a shallow recess in one face covered by a thin glass sheet, said disc also serving as one of said electrodes, and the other electrode is of smaller size than said disc and is presented toward the center of the chamber adjacent the glass cover sheet.

3. Indicating means according to claim 1, which has an annular conducting member and in which the chamber is constituted by a disc having a shallow recess in one face covered by a thin glass sheet, and in which one of said electrodes comprises a transparent conductor which is in contact with said glass sheet, said annular conducting member having an external diameter greater than that of the disc, surrounding said transparent conductor electrode and in contact therewith.

4. Indicating means according to claim 1, which has an annular conducting member and in which the chamber is constituted by a disc having a shallow recess in one face covered by a thin glass sheet, said disc being of insulating material and having a central hole, in which one of said electrodes comprises a rod extending into said hole in contact with said fluids, and in which the other of said electrodes comprises a transparent conductor which is in contact with said glass sheet, said annular conducting member having an external diameter greater than that of the disc, surrounding said transparent conductor electrode and in contact therewith.

5. Indicating means according to claim 1 which has an annular conducting member and in which the chamber is constituted by a disc having a shallow recess in one face covered by a thin glass sheet in which a second thin glass sheet is mounted in parallel relation to the first mentioned thin glass sheet, but spaced therefrom, and in which one of said electrodes comprises a transparent liquid conductor which is contained between and in contact with the said glass sheets, said annular conducting member having an external diameter greater than that of the disc and surrounding said transparent conductor electrode between said glass sheets and in contact therewith.

6. Indicating means according to claim 1 which has an annular conducting member and in which the chamber is constituted by a disc having a shallow recess in one face covered by a thin glass sheet, said disc being of insulating material and having a central hole, in which one of said electrodes comprises a rod extending into said hole, and in contact with said fluids, in which a second thin glass sheet is mounted in parallel relation to the first mentioned thin glass sheet, but spaced therefrom and in which the other of said electrodes comprises a transparent liquid conductor which is contained between and in contact with the said glass sheets, said annular conducting member having an external diameter greater than that of the disc and surrounding said transparent conductor electrode between said glass sheets and in contact therewith.

7. Indicating means for the purpose described comprising a tube of insulating material, a metal cap at one end thereof, a metal tube within the tube of insulating material connected to said metal cap, a second tube of insulating material surrounding the metal tube, an external conducting sleeve around said second tube of insulating material, a pair of electrodes disposed opposite to each other within the first tube of insulating material, an electrical connection from the external conducting sleeve to one of the electrodes, a chamber having at least a shallow portion, and two visibly distinguishable immiscible non-conducting fluids of differing specific inductive capacities within said chamber and between the electrodes, the surface between the two fluids being in the vicinity of the electrodes and at the shallow portion of the chamber.

8. Indicating means according to claim 7 wherein the second electrode is electrically connected to a metal liner in the tube of insulating material and is adapted to be capacity coupled to earth through the hand of the user.

9. A device for indicating whether an electric conductor is connected in an electric circuit, said device comprising a cylindrical chamber whose length is small in comparison with its diameter, one end wall of said chamber being a first electrode, the other end wall of said chamber being made of transparent insulating material, said chamber being closed and being partly filled with a visible liquid dielectric, a second electrode having an end portion which has a small cross-sectional area, and means for maintaining said second electrode end portion proximate to said transparent end wall with said second electrode end portion in axial alinement with the axis of said chamber.

10. A device for indicating whether an electric conductor is connected in an electric circuit, said device comprising a cylindrical chamber whose length is small in comparison with its diameter, said chamber being made of insulating material, a first electrode of relatively small cross-sectional area extending into one end wall of said chamber, the other end wall of said chamber being transparent, said chamber being closed and being partly filled with a visible liquid dielectric whose dielectric constant is substantially different from that of air, and a second electrode of transparent conducting material and having a circular face of substantially the same diameter as said chamber and means for maintaining said second electrode proximate to said transparent end wall with said electrode substantially transverse to the axis of said first electrode rod.

11. A device for indicating whether an electric conductor is connected in an electric circuit, said device comprising a housing which has a longitudinal axis, a first electrode which is supported by said housing and which has a face of relatively large area which is transverse to said axis, and a second electrode of relatively small cross-sectional area which is supported by said housing in a position proximate to and spaced from an interior portion of said first electrode face, said housing having a closed cavity positioned between said electrodes, said cavity having end faces of relatively large area in comparison with the cross-sectional area of said second electrode, one of said end faces having a transparent window therein, said cavity being partly filled with a visible liquid dielectric, the top level of said dielectric being visible through said window outside said housing when said housing is disposed with its axis inclined from the vertical.

12. A device for indicating whether an electric conductor is connected in an electric circuit, said device comprising a chamber having opposed transverse end walls and a longitudinal side wall, at least one of said end walls being transparent, the cross-sectional area of said chamber being large in comparison with its length, said chamber being partly filled with a liquid dielectric whose dielectric constant differs substantially from that of air; a first electrode which has a surface which is proximate to one of said end walls and which is substantially transverse to the axis of said chamber and which has a relatively large cross-sectional area, and a second electrode which is proximate to the other of said end walls and which has a relatively small cross-sectional area.

13. A device for indicating whether an electric conductor is connected in an electric circuit, said device comprising a housing which has a longitudinal axis, a first electrode which is supported by said housing and which has a round face of relatively large area which is transverse to said axis with said axis extending through the center of said first electrode face, and a second electrode which has a rod portion of relatively small cross-sectional area and which is supported by said housing with said rod portion in alinement with the axis of said housing and with the free end of said rod portion proximate to said first electrode, said housing being a closed cavity positioned between said electrodes, said cavity having round end faces of approximately the same area as the area of said first electrode face, the axis of said cavity being alined with the axis of said housing, one of said end faces having a transparent window therein, said cavity being partly filled with a visible liquid dielectric whose dielectric constant is substantially different from that of air, the top level of said dielectric being visible through said window outside said housing when said housing is disposed with its axis inclined from the vertical.

14. A device for indicating whether an electric conductor is connected in an electric circuit, said device comprising a cylindrical chamber whose length is small in comparison with its diameter, said chamber being made of insulating material and being closed and being partly filled with a visible liquid dielectric, a first electrode rod, said chamber being mounted on said rod and in axial alinement therewith and with said rod extending into an end wall of said chamber, the other end wall of said chamber being transparent, and a second electrode which has a circular face having substantially the same diameter as said chamber, said second electrode being transparent, and means for maintaining said second electrode proximate to said transparent end wall and substantially transverse to the axis of said chamber.

15. A device for indicating whether an electric conductor is connected in an electric circuit, said device comprising a housing which has a longitudinal axis, a first electrode which is supported by said housing and which has a face of relatively large area which is transverse to said axis, and a second electrode of relatively small cross-sectional area which is supported by said housing in a position proximate to and spaced from an interior portion of said first electrode face, said housing having a closed cavity positioned between said electrodes, said cavity having end faces of relatively large area in comparison with the cross-sectional area of said second electrode, the end face nearest said second electrode having a transparent window therein, said cavity being partly filled with a visible dielectric, the top level of said dielectric being visible through said window outside said housing when said housing is disposed with its axis inclined from the vertical.

HERBERT STANLEY PETCH.

REFERENCES CITED

The following references are of record in the file of this patent:

UNITED STATES PATENTS

| Number | Name | Date |
|---|---|---|
| 2,442,614 | Norton | June 1, 1948 |

FOREIGN PATENTS

| Number | Country | Date |
|---|---|---|
| 558,351 | Great Britain | Jan. 3, 1944 |

OTHER REFERENCES

Publication titled Liquid Dielectrics by Gemant, published by Wiley & Sons Inc., 1933, pages 105, 106 and 107.